United States Patent [19]

Hishon et al.

[11] Patent Number: 5,487,515
[45] Date of Patent: Jan. 30, 1996

[54] SEAT BELT RETRACTOR WITH LOCK BAR ACTUATOR

[75] Inventors: Michael K. Hishon, New Baltimore; Steven Stoll, Mt. Clemens, both of Mich.

[73] Assignee: TRW Vehicle Safety Systems Inc., Lyndhurst, Ohio

[21] Appl. No.: 156,583

[22] Filed: Nov. 23, 1993

[51] Int. Cl.$^6$ ................................................ B60R 22/405
[52] U.S. Cl. ................................ 242/383.4; 242/384.6
[58] Field of Search ........................ 242/383.4, 384.6, 242/383, 383.1, 383.2, 383.3, 383.5; 280/806; 297/478, 480

[56] References Cited

U.S. PATENT DOCUMENTS

| Re. 29,594 | 3/1978 | Takada et al. . | |
|---|---|---|---|
| 3,802,641 | 4/1974 | Saito . | |
| 3,929,300 | 12/1975 | Lindquist | 242/383.5 |
| 4,099,685 | 7/1978 | Paitula | 242/383.5 |
| 4,187,995 | 12/1980 | Rex | 242/383.4 |
| 4,293,106 | 10/1981 | Standing . | |
| 4,422,594 | 12/1983 | Honl . | |
| 4,452,405 | 6/1984 | Adomeit . | |
| 4,455,000 | 6/1984 | Nilsson . | |
| 4,467,980 | 8/1984 | Fohl . | |
| 4,667,893 | 5/1987 | Fohl . | |
| 4,726,541 | 2/1988 | Tsukamoto et al. . | |
| 4,729,523 | 3/1988 | Saitou et al. | 242/383.1 |
| 4,729,525 | 3/1988 | Rumpf . | |
| 4,830,310 | 5/1989 | Higbee . | |
| 5,014,926 | 5/1991 | Rumpf et al. . | |

*Primary Examiner*—John M. Jillions
*Attorney, Agent, or Firm*—Tarolli, Sundheim & Covell

[57] ABSTRACT

A seat belt retractor (10) includes a frame (12), a spool (50) supported for rotation on the frame (12), and a lock bar (100) which blocks rotation of the spool (50) when the lock bar (100) is actuated. The retractor (10) further includes a lock bar actuator (112) supported for movement relative to the frame (12), and a collision sensitive mechanism for moving the actuator (112) from an unactuated position to an actuated position. The actuator (112) actuates the lock bar (100) upon movement of the actuator (112) from the unactuated position to the actuated position. The actuator (112) includes a spring (118) for resisting movement of the actuator (112) relative to the frame (12).

28 Claims, 6 Drawing Sheets

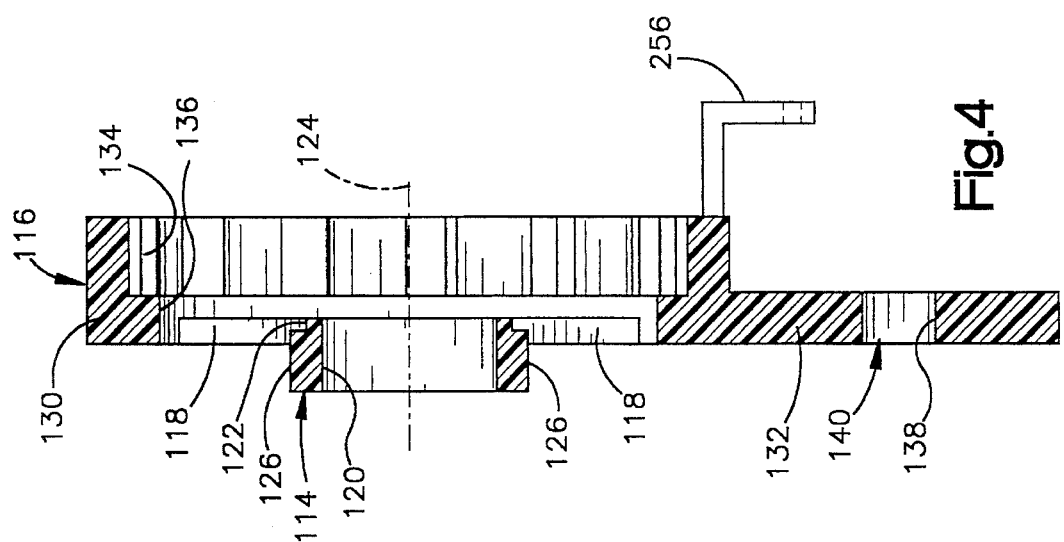
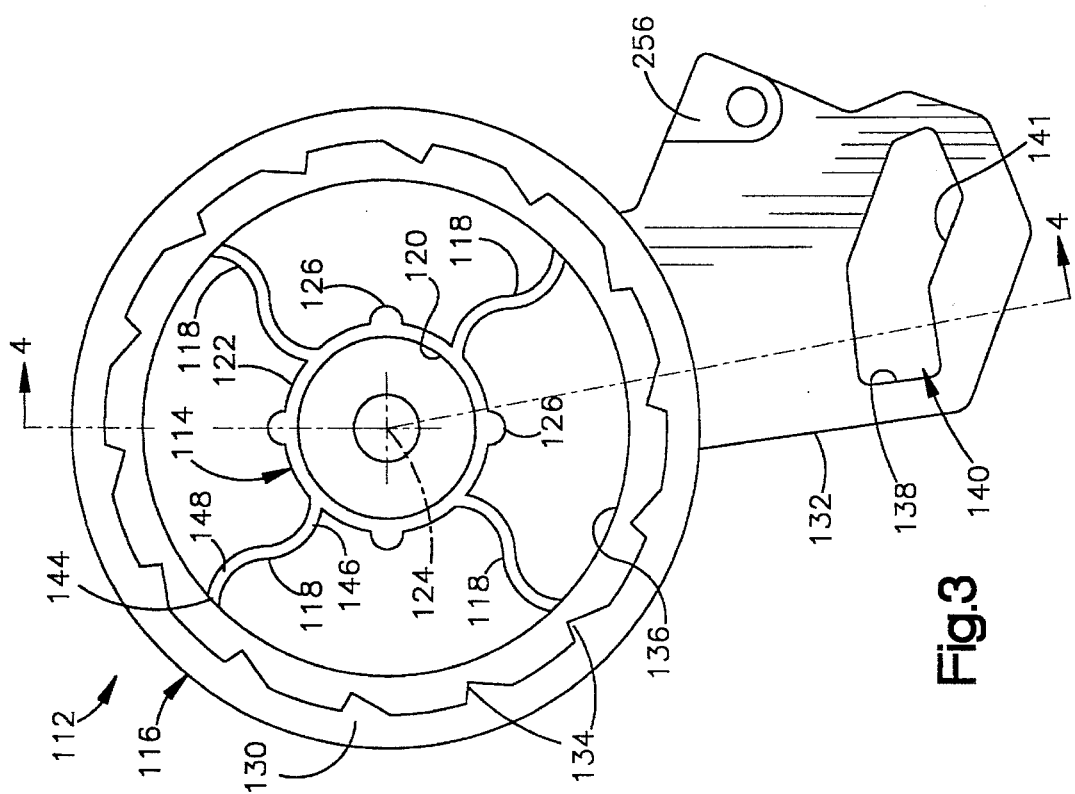

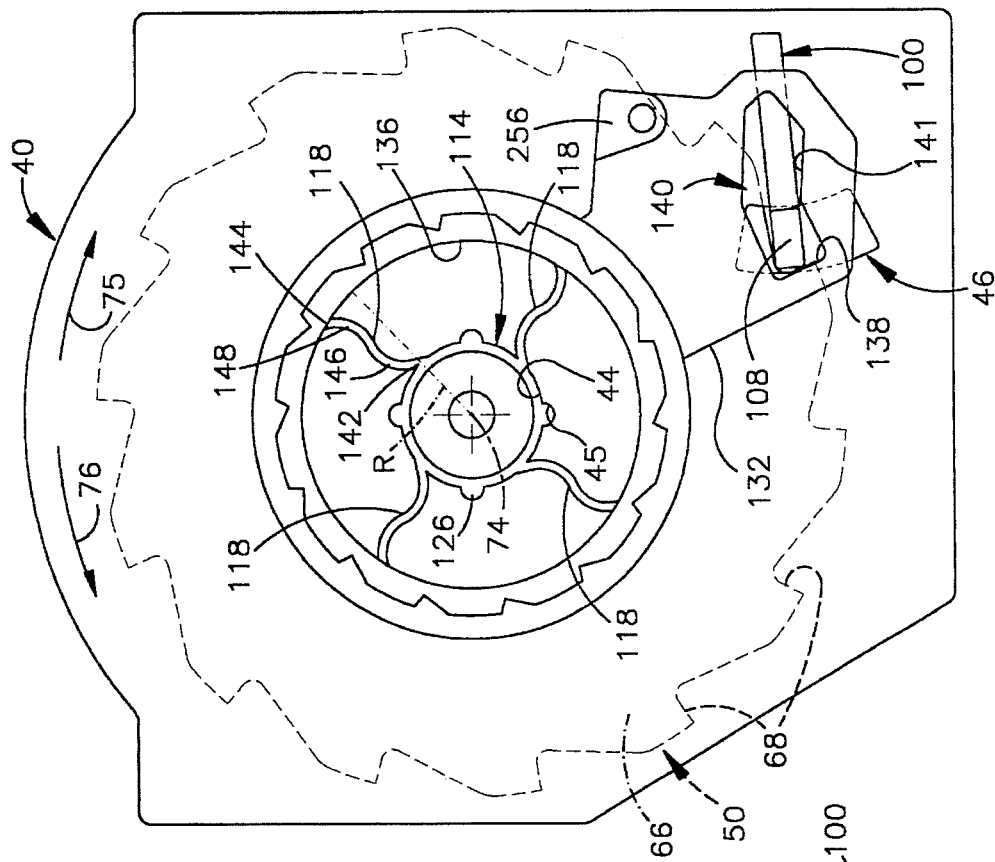
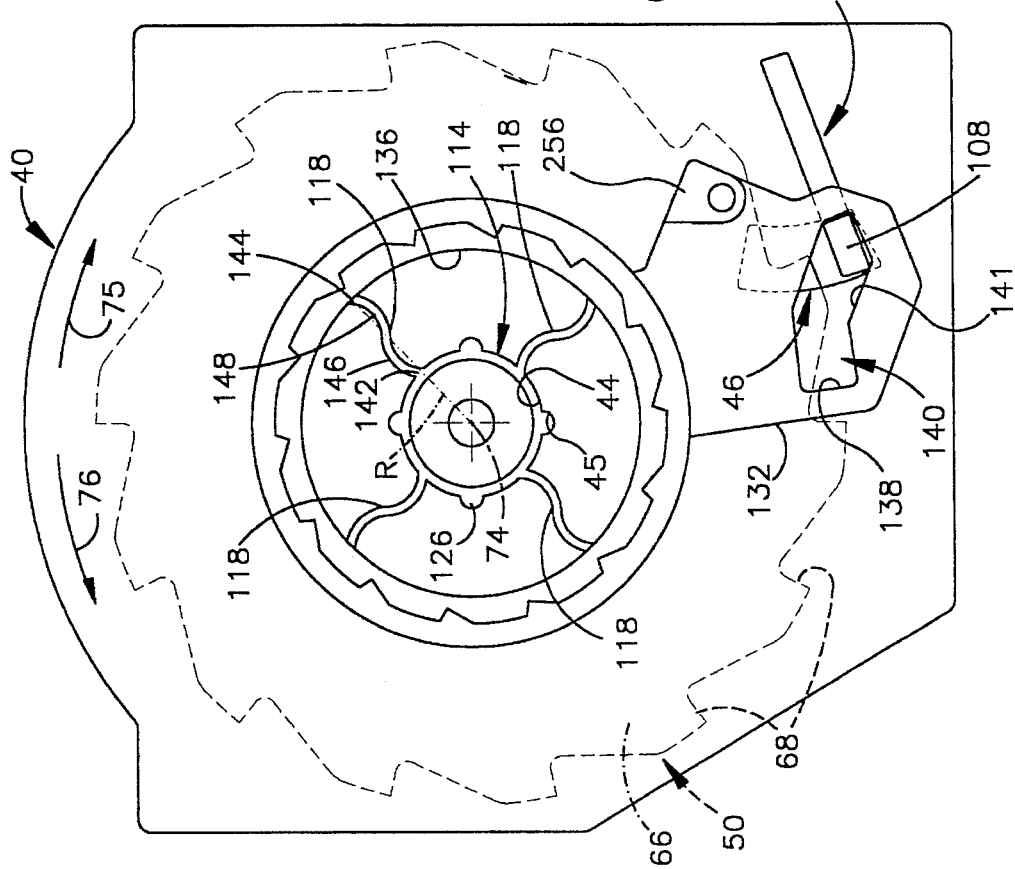

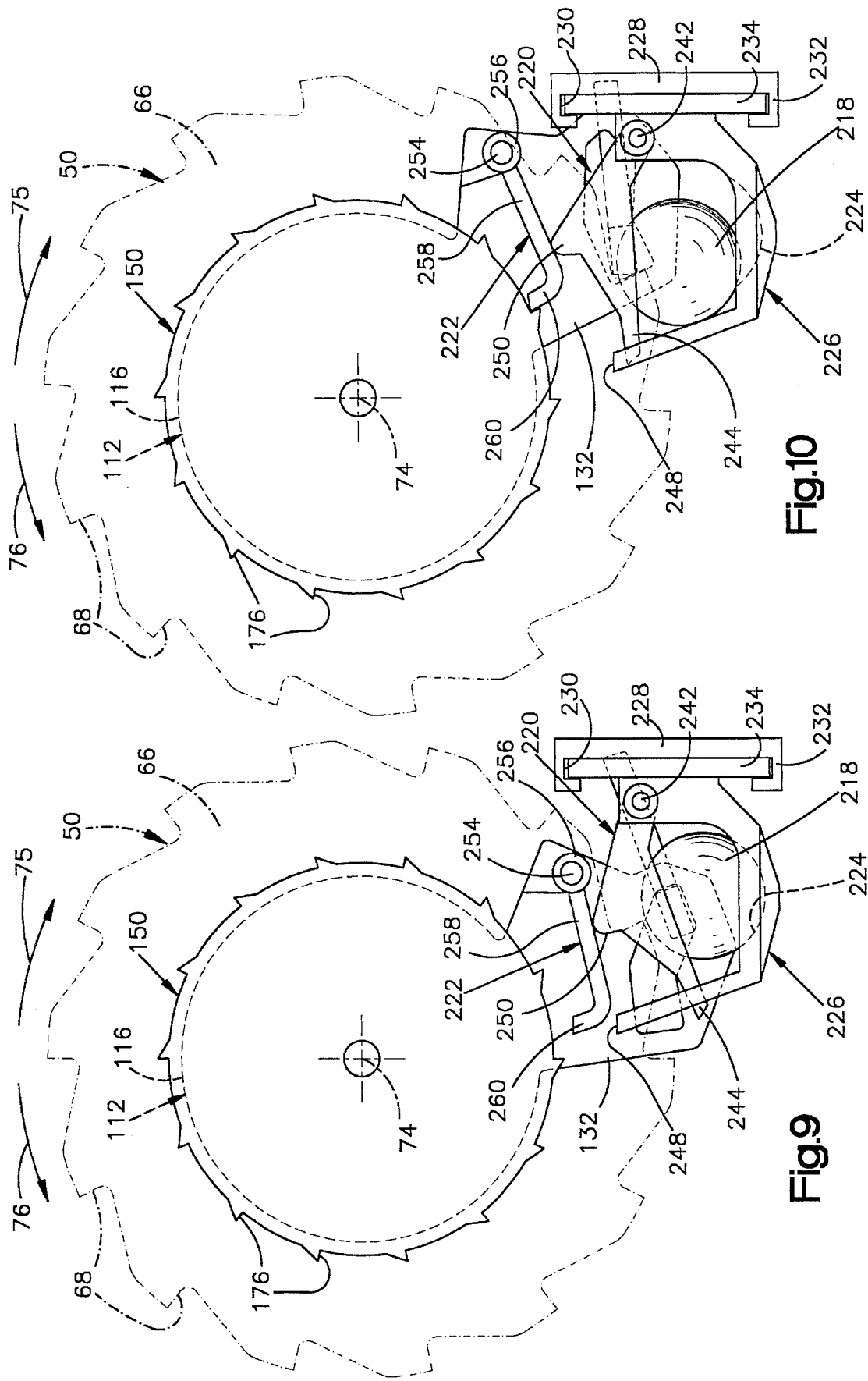

SEAT BELT RETRACTOR WITH LOCK BAR ACTUATOR

FIELD OF THE INVENTION

The present invention relates to a seat belt retractor, and particularly relates to a lock bar actuator in a seat belt retractor.

BACKGROUND OF THE INVENTION

U.S. Pat. No. 5,014,926 discloses a seat belt retractor having a rotatable spool upon which seat belt webbing is wound. The webbing has a retracted position in which it is located beside a vehicle seat, and has an extended position in which it extends around an occupant of the seat. The spool in the retractor rotates in an unwinding direction as the webbing is withdrawn from the retractor upon movement of the webbing from the retracted position toward the extended position. A rewind spring in the retractor rotates the spool oppositely in a winding direction to retract the webbing back into the retractor, and thus to move the webbing back from the extended position toward the retracted position.

The retractor disclosed in the '926 patent includes a locking mechanism which operates to block rotation of the spool in the unwinding direction upon the occurrence of a vehicle collision. The locking mechanism includes a lock bar which is movable into a locking position in which it blocks rotation of the spool in the unwinding direction. The locking mechanism further includes a lock bar actuator which moves the lock bar into the locking position. The actuator is supported for limited rotation in the retractor. A cam portion of the actuator moves the lock bar into the locking position upon rotation of the actuator.

When the vehicle experiences a collision, a vehicle occupant moves suddenly against the seat belt webbing that is extended around the occupant. This causes the spool to accelerate in the unwinding direction. A web sensitive mechanism in the retractor responds to such acceleration of the spool by coupling the actuator rotationally with the spool. The actuator then rotates a short distance with the spool, and the cam portion of the actuator moves the lock bar into the locking position. The retractor thus operates to block rotation of the spool in the unwinding direction in response to sudden movement of the webbing which indicates the occurrence of a collision.

Additionally, when the vehicle experiences a predetermined amount of deceleration which indicates the occurrence of a collision, a vehicle sensitive mechanism in the retractor responds to such deceleration by coupling the actuator with the spool. The actuator then rotates a short distance with the spool, and the cam portion of the actuator moves the lock bar into the locking position. The retractor thus operates further to block rotation of the spool in the unwinding direction in response to vehicle deceleration indicative of a collision.

SUMMARY OF THE INVENTION

In accordance with the present invention, a seat belt retractor comprises a frame, a spool supported for rotation on the frame, and a locking means for blocking rotation of the spool when the locking means is actuated. The retractor further comprises a movable actuator member and a means for moving the actuator member from an unactuated position to an actuated position. The actuator member actuates the locking means upon movement of the actuator member from the unactuated position to the actuated position. The actuator member includes a spring means for resisting movement of the actuator member relative to the frame.

In a preferred embodiment of the present invention, the actuator member has a wheel portion, a hub portion and a spring portion. The wheel portion of the actuator member is supported for rotation relative to the frame, and defines the unactuated and actuated positions of the actuator member. The means for moving the actuator member from the unactuated position to the actuated position includes means for coupling the wheel portion rotationally with the spool. The hub portion of the actuator member is fixed relative to the frame, and the spring portion comprises a plurality of spring arms extending radially outward from the hub portion to the wheel portion. The spring arms resist rotation of the wheel portion relative to the hub portion from the unactuated position toward the actuated position, and urge the wheel portion to rotate back from the actuated position toward the unactuated position.

BRIEF DESCRIPTION OF THE DRAWINGS

Further features of the present invention will become apparent to those skilled in the art to which the present invention relates from reading the following description with reference to the accompanying drawings, in which:

FIG. 3 is a view of a part of the retractor of FIG. 1;

FIG. 4 is a view taken on line 4—4 of FIG. 3;

FIG. 5 is a view of the part shown in FIG. 3 in association with other parts of the retractor of FIG. 1;

FIG. 6 is a view showing the parts of FIG. 5 in actuated positions;

FIG. 9 is a schematic view showing parts of the retractor of FIG. 1 in unactuated positions; and FIG. 10 is a schematic view showing the parts of FIG. 9 in actuated positions.

DESCRIPTION OF PREFERRED EMBODIMENT

Figure 1:
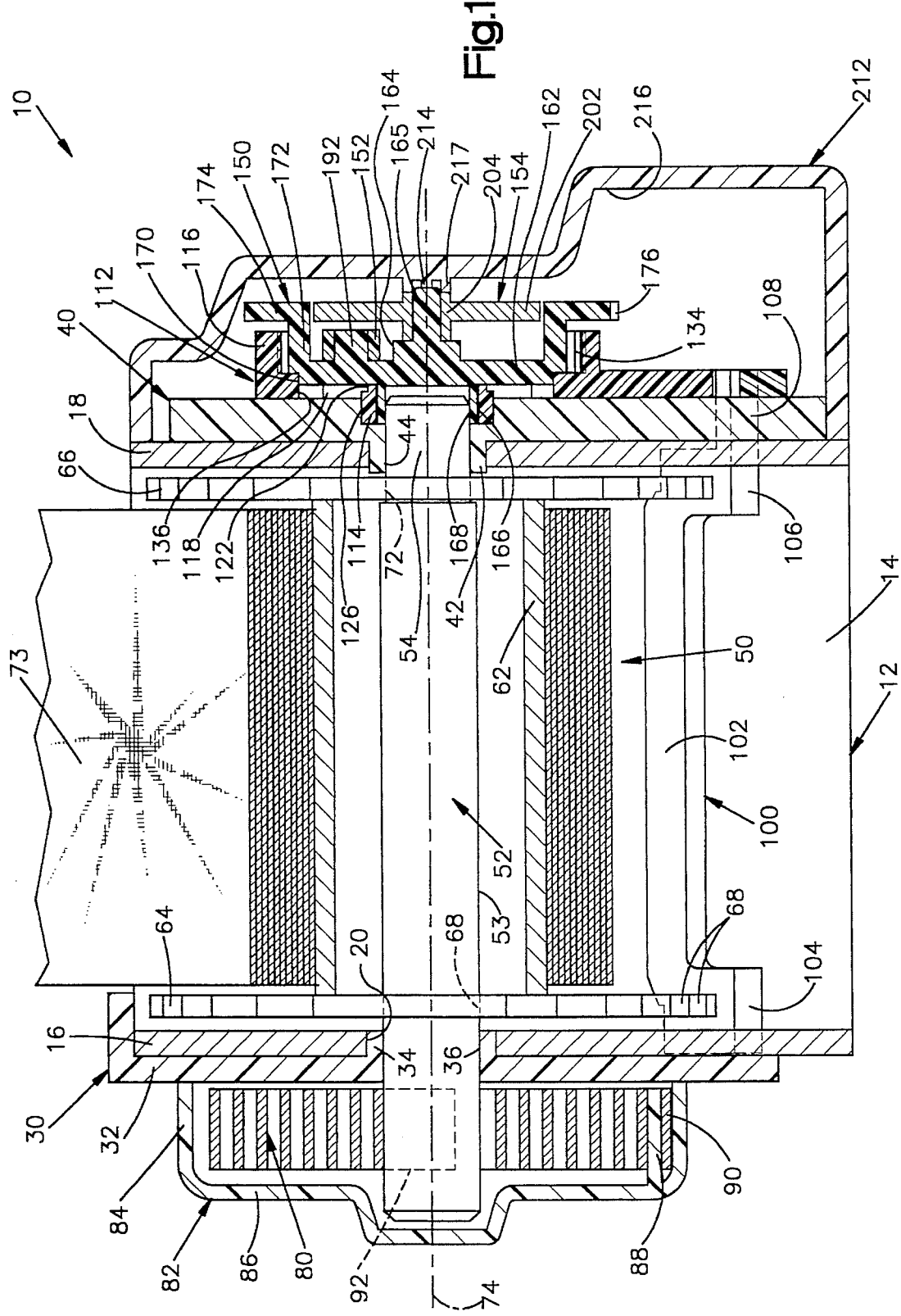
FIG. 1 is a partial sectional view of a seat belt retractor comprising a preferred embodiment of the present invention.
Figure 2:
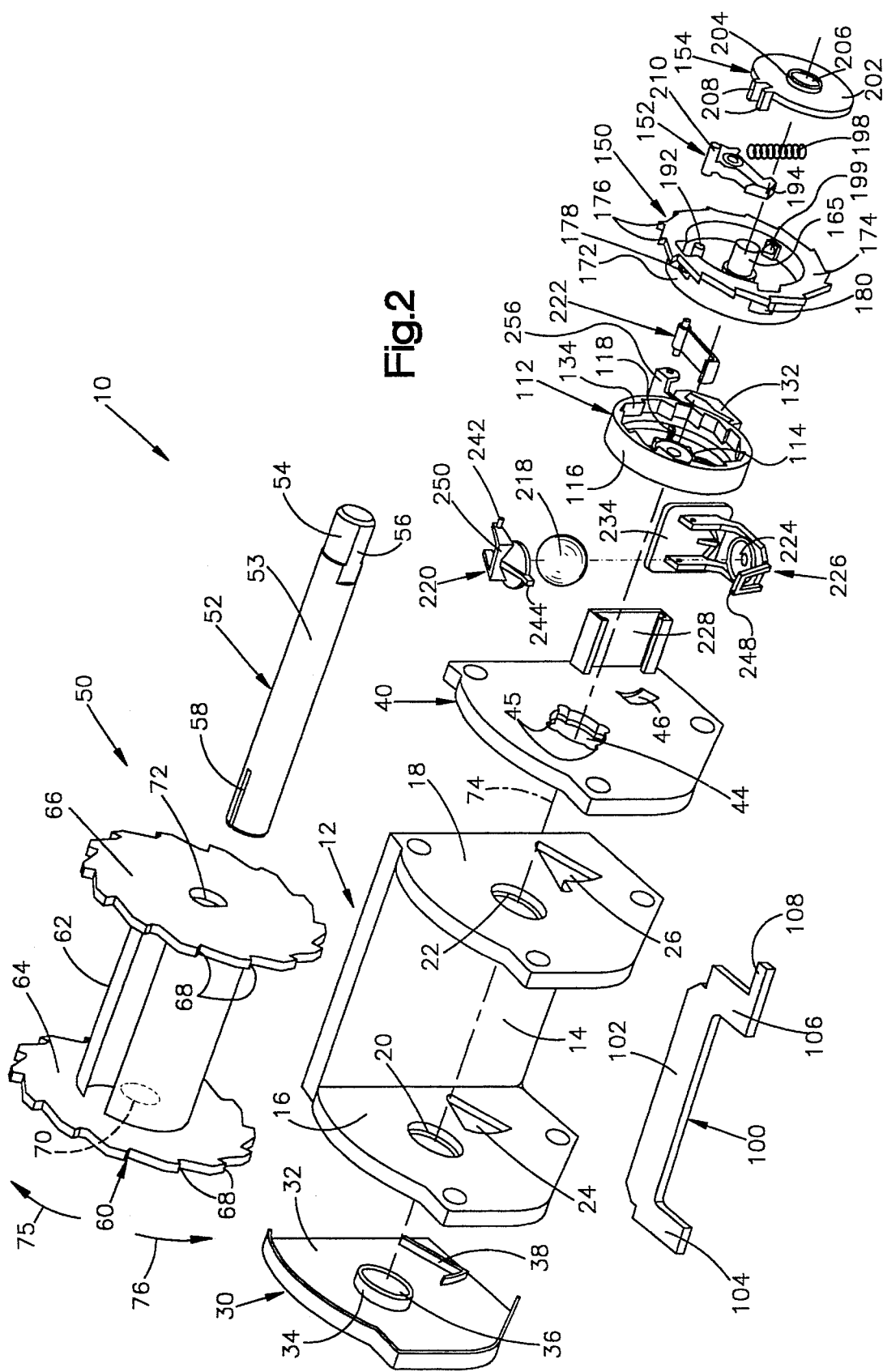
FIG. 2 is an exploded perspective view of parts of the retractor of FIG. 1.

As shown in FIGS. 1 and 2, a vehicle seat belt retractor 10 comprising a preferred embodiment of the present invention includes a frame 12. The frame 12 has a base 14 and sides 16 and 18 extending perpendicular to the base 14. A circular opening 20 and a somewhat triangular opening 24 extend through the frame side 16. Another circular opening 22, which is coaxial with the circular opening 20, and another triangular opening 26, which is aligned with the triangular opening 24, extend through the other frame side 18. The frame 12 is preferably made of metal and is fixedly connected to a vehicle in which the retractor 10 is installed.

A plastic plate 30 is fixed to the frame side 16. The plate 30 has a wall portion 32 with a projecting boss 34. A circular opening 36 extends through the wall portion 32 and the boss 34. The wall portion 32 of the plate 30 abuts the frame side 16. The boss 34 fits within the circular opening 20 in the frame side 16. A projection 38 is attached to the wall portion 32 of the plate 30, and fits within the triangular opening 24 in the frame side 16 adjacent the surface that defines the opening 24.

A plastic attachment plate 40 is fixed to the frame side 18. A circular boss 42 (FIG. 1) projects from the attachment plate 40. A circular opening 44 extends through the attachment plate 40 and the boss 42. A plurality of notches 45 (FIG. 2) extend radially outward from the circular opening 44. The boss 42 fits within the circular opening 22 in the frame side 18. A lock bar opening 46 in the attachment plate 40 is aligned with a portion of the triangular opening 26 in the frame side 18.

A spool 50 includes a shaft 52 having a full diameter major portion 53 and a reduced diameter end portion 54. A flat 56 on the shaft 52 extends axially along the length of the end portion 54 and further along a small part of the major portion 53. The flat 56 gives the shaft 52 a D-shaped cross-sectional configuration at its right end, as viewed in FIG. 2. An axially extending slot 58 extends diametrically through the opposite end of the shaft 52.

The spool 50 also includes a reel 60 which comprises a sleeve 62 and a pair of ratchet wheels 64 and 66 fixed to opposite axial ends of the sleeve 62. Each of ratchet wheels 64 and 66 has on its perimeter a plurality of circumferentially spaced ratchet teeth 68. The shaft 52 extends axially through the reel 60. The major portion 53 of the shaft 52 extends through a circular opening 70 in the ratchet wheel 64. The D-shaped end portion 54 of the shaft 52 extends through a D-shaped opening 72 in the ratchet wheel 66. Thus, the reel 60 rotates with the shaft 52. As shown in FIG. 1, seat belt webbing 73 is wound about the sleeve 62.

The shaft 52 extends through the circular opening 20 in the frame side 16 and the circular opening 36 in the plate 30, and is supported for rotation about an axis 74 by the boss 34 on the plate 30. The shaft 52 also extends through the circular opening 22 in the other frame side 18 and the circular opening 44 in the attachment plate 40, and is further supported for rotation about the axis 74 by the boss 42 projecting from the attachment plate 40. Thus, the spool 50 is rotatable about the axis 74 relative to the frame 12 in a winding direction 75 (FIG. 2) and an unwinding direction 76.

A rewind coil spring 80 (FIG. 1) is located within a spring cover 82 fixed to the plate 30. The spring cover 82 has an axially extending wall portion 84 and a radially extending wall portion 86. A spring catch member 88 is fixed to the inside of the spring cover 82. A radially outer end portion 90 of the rewind spring 80 is attached to the catch member 88. A radially inner end portion 92 of the rewind spring 80 is received in the slot 58 in the shaft 52. The rewind spring 80 acts between the spring cover 82 and the shaft 52 and biases the spool 50 to rotate about the axis 74 in the winding direction 75.

A lock bar 100 has a central portion 102 (best shown in FIG. 2) which extends between a pair of locking portions 104 and 106. A lock bar finger 108 extends axially from the locking portion 106. One end of the lock bar 100 is supported on the plastic projection 38 in the triangular opening 24 in the frame side 16. The plastic projection 38 minimizes rattling noises caused by metal-to-metal contact between the lock bar 100 and the frame side 16. The other end of the lock bar 100 extends through the triangular opening 26 in the frame side 18. The lock bar finger 108 extends through the lock bar opening 46 in the attachment plate 40.

The retractor 10 further includes a lock bar actuator 112. As shown fully in FIGS. 3 and 4, the actuator 112 has a hub portion 114 and a wheel portion 116. A plurality of spring arms 118 extend radially from the hub portion 114 to the wheel portion 116. The actuator 112 is preferably constructed as a continuous piece of molded plastic which includes the hub portion 114, the wheel portion 116, and the spring arms 118.

The hub portion 114 of the actuator 112 has an annular shape with a cylindrical inner surface 120 and a cylindrical outer surface 122, both of which are centered on an axis 124. A plurality of axially extending ribs 126 project radially outward from the cylindrical outer surface 122.

The wheel portion 116 of the actuator 112 includes an annular body 130 and a cam arm 132 projecting radially from the annular body 130. A plurality of ratchet teeth 134 on the annular body 130 are arranged in a row extending circumferentially around the axis 124, and face radially inward toward the axis 124. A cylindrical inner surface 136 of the annular body 130 spaces the row of ratchet teeth 134 axially from the hub portion 114 of the actuator 112, as shown in FIG. 4. The cam arm 132 has an inner edge surface 138 which defines a slot 140 extending through the cam arm 132. The inner edge surface 138 has a cam portion 141.

Each of the spring arms 118 extends radially from the cylindrical outer surface 122 of the hub portion 114 to the cylindrical inner surface 136 of the wheel portion 116. The spring arms 118 thus support the wheel portion 116 for rotation about the axis 124 relative to the hub portion 114 against the bias of the spring arms 118. In the preferred embodiment of the invention shown in the drawings, the actuator 112 has four such spring arms 118 in locations that are spaced 90° from each other about the axis 124 of the actuator 112. The actuator 112 could alternatively have a greater or lesser number of the spring arms 118.

As shown in FIGS. 5 and 6, the actuator 112 is mounted on the attachment plate 40 in a position coaxial with the spool 50, i.e., centered on the axis 74. Specifically, the hub portion 114 of the actuator 112 is received coaxially in the circular opening 44 in the attachment plate 40, with the ribs 126 extending radially outward into the notches 45. The hub portion 114 of the actuator 112 is thus fixed relative to the attachment plate 40 and the frame 12, with the ribs 126 precluding rotation of the hub portion 114 about the axis 74. When the actuator 112 is thus mounted on the attachment plate 40, the lock bar finger 108, which extends axially outward from the lock bar opening 46 in the attachment plate 40, extends further through the slot 140 in the cam arm 132 of the actuator 112.

The actuator 112 is movable between an unactuated position, as shown in FIG. 5, and an actuated position, as shown in FIG. 6. When the actuator 112 is in the unactuated position of FIG. 5, the spring arms 118 are unstressed, and the lock bar 100 is in an unlocked position spaced from the ratchet teeth 68 on the spool 50. As noted above, the spring arms 118 support the wheel portion 116 of the actuator 112 for rotation relative to the hub portion 114 against the bias of the spring arms 118. The wheel portion 116 of the actuator 112 is thus rotatable about the hub portion 114 against the bias of the spring arms 118 in a counterclockwise direction, as viewed in the drawings, from the unactuated position of FIG. 5 to the actuated position of FIG. 6. The wheel portion 116 thus defines the unactuated and actuated positions of the actuator 112.

When the wheel portion 116 of the actuator 112 moves into the actuated position, the cam portion 141 of the inner edge surface 138 on the cam arm 132 moves against the lock bar finger 108 to lift the lock bar 100 into the locked position shown in FIG. 6. The locking portions 104 and 106 (FIG. 2) of the lock bar 100 then extend into the paths of movement of the ratchet teeth 68 on the spool 50 to block rotation of the spool 50 in the unwinding direction 76.

In accordance with a particular feature of the actuator 112, the spring arms 118 are designed to maintain a constant radial spacing between the axis 74 and the wheel portion 116 throughout rotation of the wheel portion 116 between the unactuated position and the actuated position. Each of the spring arms 118 has an inner end 142 at the cylindrical surface 122 of the hub portion 114 and an outer end 144 at the cylindrical surface 136 of the wheel portion 116. When the actuator 112 is in the unactuated position, the inner and outer ends 142 and 144 of each spring arm 118 are aligned with each other on a radius of the cylindrical surface 136, such as the radius R shown in FIG. 5. Each spring arm 118 further has a somewhat S-shaped configuration defined by radially inner and outer arm sections 146 and 148 which are curved oppositely relative to each other.

When the wheel portion 116 rotates relative to the hub portion 114 in the counterclockwise direction from the position of FIG. 5 to the position of FIG. 6, the outer end 144 of each spring arm 118 moves circumferentially relative to the inner end 142. The outer end 144 thus moves out of radial alignment with the inner end 142, as shown with reference to the radius R in FIG. 6. One or both of the arm sections 146 and 148 then straightens slightly. The effective length of the spring arm 118 thus increases to enable the outer end 144 to move away from the inner end 142. This enables the distance along the radius R from the inner end 142 to the cylindrical surface 136 to remain unchanged upon movement of the outer end 144 circumferentially relative to the inner end 142. As a result, the cylindrical surface 136 on the wheel portion 116 does not move radially relative to the cylindrical surface 122 on the hub portion 114. In the preferred embodiment of the invention shown in the drawings, the spring arms 118 can accomplish this effect throughout a range of rotation of at least 20° about the axis 74, which is great enough to include the range of rotation of the wheel portion 116 of the actuator 112. Therefore, the wheel portion 116 does not move radially when rotating about the axis 74, and the cam arm 132 on the wheel portion 116 moves the lock bar 100 precisely into the same locked position each time the wheel portion 116 rotates into the actuated position.

When the vehicle experiences a collision, a vehicle occupant moves suddenly against the seat belt webbing 73 that extends around the occupant. This causes the spool 50 to accelerate in the unwinding direction 76. The retractor 10 has parts which operate to move the actuator 112 from the unactuated position to the actuated position in response to such acceleration of the spool 50 in the unwinding direction 76. Such parts of the retractor include a ratchet wheel 150, a control pawl 152 and a flyweight 154, each of which is shown separately in the exploded view of FIG. 2.

The ratchet wheel 150 is located adjacent to the actuator 112 and the attachment plate 40. As shown in FIG. 1, the ratchet wheel 150 has a radially extending disk portion 162. The disk portion 162 of the ratchet wheel 150 has a relatively large axial projection 164 and a reduced diameter axial projection 165 extending from the disk portion 162 in a direction away from the spool 50. A boss 166 projects axially from the disk portion 162 in a direction toward the spool 50. The boss 166 on the ratchet wheel 150 thus extends coaxially through the hub portion 114 of the actuator 112. A D-shaped opening 168 in the boss 166 receives the D-shaped end portion 54 of the shaft 52. Thus, the ratchet wheel 150 rotates about the axis 74 with the spool 50.

The disk portion 162 of the ratchet wheel 150 further has a cylindrical outer surface 170 which adjoins the cylindrical inner surface 136 of the actuator 112. The ratchet wheel 150 also has a cylindrical wall 172 which extends axially from the disk portion 162 in a direction away from the spool 50. The cylindrical wall 172 of the ratchet wheel 150 is located radially inward of the ratchet teeth 134 on the actuator 112, and is closely spaced from the ratchet teeth 134.

A circular wall 174 of the ratchet wheel 150 extends radially outward from the end of the cylindrical wall 172. A plurality of ratchet teeth 176 are formed on the perimeter of the circular wall 174. The cylindrical wall 172 and the circular wall 174 are partially cut away at two circumferentially spaced locations to form first and second openings 178 and 180 (FIG. 2) extending radially through the ratchet wheel 150 from the interior to the exterior of the ratchet wheel 150.

Figure 7:
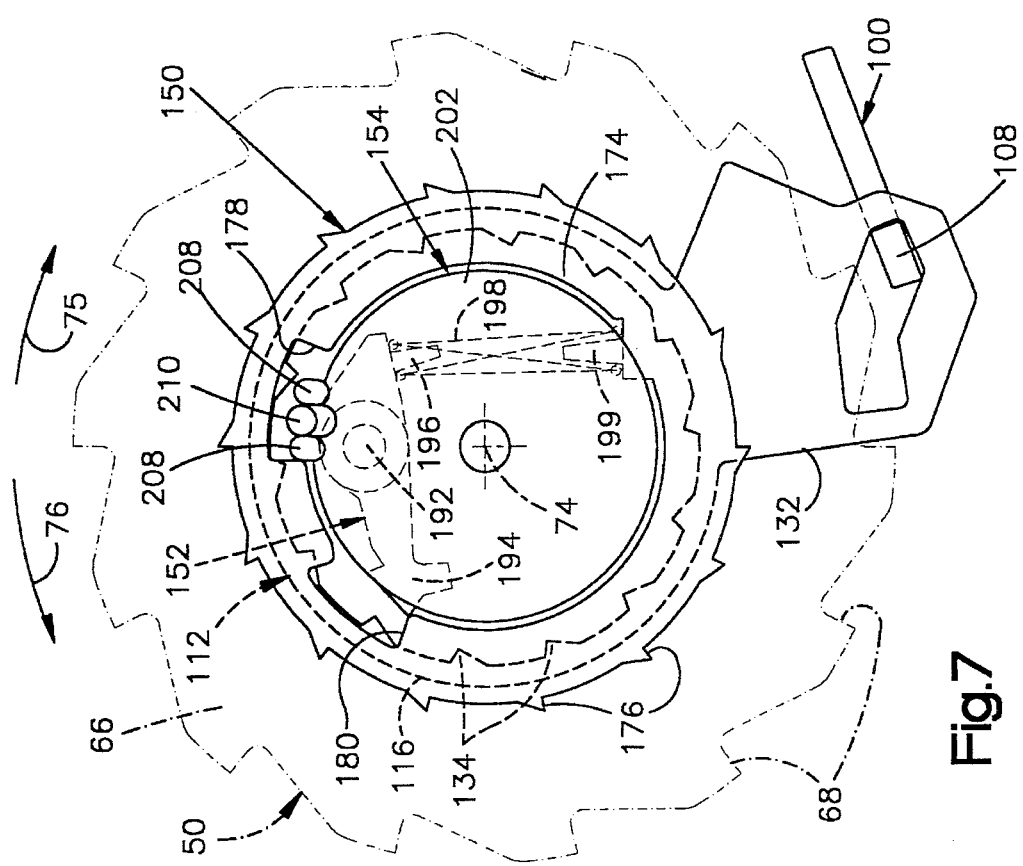
FIG. 7 is a schematic view showing parts of the retractor of FIG. 1 in unactuated positions.

As shown in FIG. 7, the control pawl 152 is supported for pivotal movement on a pawl mounting hub 192 on the ratchet wheel 150. The control pawl 152 has at one end a pawl tooth 194 and at its opposite end a spring support 196. The pawl tooth 194 is located adjacent to the second opening 180 in the ratchet wheel 150. A pawl spring 198 extends between the spring support 196 on the control pawl 152 and another spring support 199 on the interior of the cylindrical wall 172 of the ratchet wheel 150. The pawl spring 198 biases the control pawl 190 about the mounting hub 192 in a counterclockwise direction, as viewed in FIG. 7, so that the pawl tooth 194 is normally spaced radially inward of the second opening 180 in the ratchet wheel 150. The pawl tooth 194 is thus normally spaced radially inward from the ratchet teeth 134 on the actuator 112.

The flyweight 154 is made of a relatively heavy material, such as zinc, and is supported on the ratchet wheel 150 for rotation relative to the ratchet wheel 150. The flyweight 154 has a disk portion 202 and a hub 204 with a central opening 206 extending through the hub 204. The reduced diameter axial projection 165 on the ratchet wheel 150 extends axially through the opening 206 in the flyweight 154. A pair of circumferentially spaced control pins 208 are positioned on the perimeter of the disk portion 202 of the flyweight 154. The control pins 208 on the flyweight 154 project radially and axially into the first opening 178 in the ratchet wheel 150, and are located on opposite sides of an axially extending pin 210 on the control pawl 152. The flyweight 154 is rotated about the axis 74 by the pin 210 on the control pawl 152 as the control pawl 152 rotates with the ratchet wheel 150.

The flyweight 154 is retained axially on the reduced diameter axial projection 165 on the ratchet wheel 150 by a cover 212 (FIG. 1) which is fixed to the attachment plate 40 and the frame 12. A central projection 214 on the inner surface 216 of the cover 212 engages the outer end of the reduced diameter axial projection 165 on the ratchet wheel 150. An annular projection 217 on the inner surface 216 of the cover 212 engages the flyweight hub 204 and holds the flyweight 154 axially against the larger axial projection 164 on the ratchet wheel 150.

Figure 8:
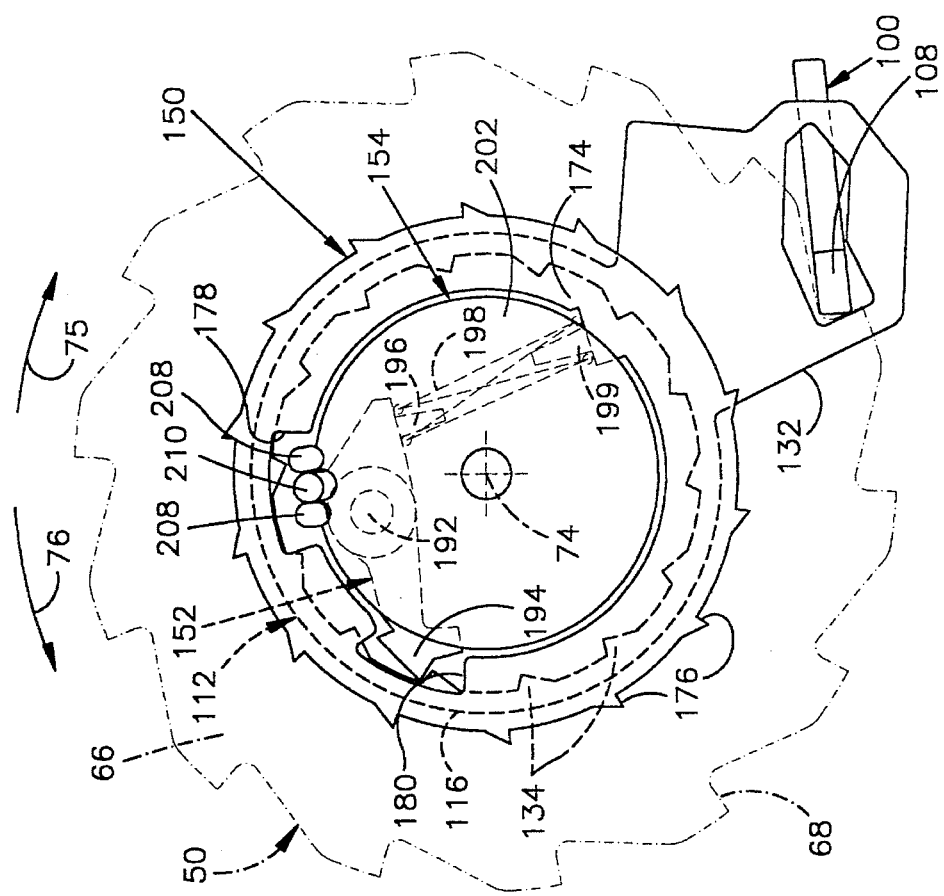
FIG. 8 is a schematic view showing the parts of FIG. 7 in actuated positions.

As noted above, the ratchet wheel 150, the control pawl 152 and the flyweight 154 cooperate to move the actuator 112 into the actuated position when the spool 50 accelerates in the unwinding direction upon the occurrence of a vehicle collision. When the spool 50 accelerates in the unwinding direction 76, the ratchet wheel 150 and the control pawl 152, which are rotationally fixed to the spool 50, also accelerate in the unwinding direction 76. When the spool 50 accelerates in the unwinding direction 76 at or above a predetermined acceleration which indicates the occurrence of a collision, the flyweight 154 lags rotation of the spool 50 because the flyweight 154 is relatively heavy. The flyweight 154 thus rotates relative to the ratchet wheel 150 and the control pawl 152 in the clockwise direction as viewed in FIG. 7. The control pins 208 on the flyweight 154 then retard rotation of the pin 210 on the control pawl 152. This causes the control pawl 154 to pivot on the mounting hub 192 in the clockwise direction against the bias of the pawl spring 198. The pawl tooth 194 then moves radially outward through the second opening 180 in the ratchet wheel 150 and into engagement with the ratchet teeth 134 on the actuator 112. The control pawl 152 thus couples the wheel portion 116 of the actuator 112 rotationally with the ratchet wheel 150. Thereafter, the control pawl 152 transmits rotational force from the spool 50 and the ratchet wheel 150 to the wheel portion 116 of the actuator 112 to rotate (or pivot) the wheel portion 116 from the unactuated position, as shown in FIG. 7, to the actuated position, as shown in FIG. 8. The lock bar 100 is thus moved into the locked position in which it engages the ratchet teeth 68 on the spool 50 to block rotation of the spool 50 in the unwinding direction 76.

The retractor 10 further has parts which operate to move the actuator 112 into the actuated position in response to vehicle deceleration which indicates the occurrence of a vehicle collision. Such parts of the retractor 10 also are shown separately in the exploded view of FIG. 2, and include an inertia weight 218, a sensor lever 220 and a lock-up lever 222.

The inertia weight 218 in the preferred embodiment of the invention is a steel ball, but other known inertia weights could be used as alternatives. As shown in FIG. 9, the inertia weight 218 is located in a cavity 224 in a sensor housing 226. A sensor housing support plate 228 is fixed to the attachment plate 40. The support plate 228 has an upper channel 230 and a lower channel 232. A back plate 234 of the sensor housing 226 is received in the upper and lower channels 230 and 232 of the support plate 228. The sensor housing 226 is thereby fixedly connected, through the support plate 228, to the attachment plate 40 and the frame 12.

The sensor lever 220 is pivotally mounted on the sensor housing 226. Two pivot pins 242 on the sensor lever 220, one of which is shown in the drawings, are received in openings in the sensor housing 226. The sensor lever 220 rests upon the inertia weight 218. A projection 244 of the sensor lever 220 extends through an open end portion 248 of the sensor housing 226. The projection 244 can engage the open end portion 248 of the housing 226 to limit upward pivotal movement of the sensor lever 220. An upper portion 250 of the sensor lever 220 extends upwardly in a direction away from the inertia weight 218.

The lock-up lever 222 rests on the upper portion 250 of the sensor lever 220. The lock-up lever 222 is pivotally mounted on the cam arm 132 of the actuator 112. Two pivot pins 254 on the lock-up lever 222 are received in spaced apart openings (only one of which is shown in the drawings) in a lever mounting portion 256 of the cam arm 132. A first leg 258 of the lock-up lever 222 extends from the pivot pins 254 of the lock-up lever 222 and rests on the portion 250 of the sensor lever 220. A second leg 260 of the lock-up lever 222 extends upwardly at an angle from the first leg 258 in a direction toward the ratchet wheel 150, and is normally spaced from the ratchet teeth 176 on the ratchet wheel 150.

When the vehicle experiences deceleration of at least a predetermined amount which indicates the occurrence of a collision, the inertia weight 218 moves upward from the cavity 224 in the sensor housing 226 and pivots the sensor lever 220 upward against the lock-up lever 222. The sensor lever 220 in turn pivots the lock-up lever 222 upward, and the second leg 260 of the lock-up lever 222 is thus moved into the path of movement of the ratchet teeth 176 on the ratchet wheel 150. Further rotation of the spool 50 and the ratchet wheel 150 in the unwinding direction 76 causes the next available ratchet tooth 176 to engage the second leg 260 of the lock-up lever 222. The actuator 112, upon which the lock-up lever 222 is mounted, is thus coupled rotationally with the ratchet wheel 150 and the spool 50 by the lock-up lever 222. Thereafter, the lock-up lever 222 transmits rotational force from the ratchet wheel 150 to the wheel portion 116 of the actuator 112 to rotate the wheel portion 116 from the unactuated position, as shown in FIG. 9, to the actuated position, as shown in FIG. 10. The lock bar 100 is thus moved into the locked position in which it engages the ratchet teeth 68 on the spool 50 to block rotation of the spool 50 in the unwinding direction 76.

From the above description of the invention, those skilled in the art will perceive improvements, changes and modifications. Such improvements, changes and modifications within the skill of the art are intended to be covered by the appended claims.

Having described the invention, the following is claimed:

1. Apparatus comprising:

a frame;

a spool supported for rotation on said frame;

locking means for blocking rotation of said spool when said locking mean is actuated;

an actuator member supported for movement relative to said frame, said actuator member having means for actuating said locking means upon movement of said actuator member from an unactuated position to an actuated position; and means for moving said actuator member from said unactuated position to an actuated position;

said actuator member including spring means for resisting movement of said actuator member relative to said frame, said actuator member having a first portion supported for movement relative to said frame, said first portion of said actuator member defining said unactuated and actuated positions, said actuator member further having a second portion which is fixed relative to said frame, said spring means resisting movement of said first portion relative to said second portion.

2. Apparatus as defined in claim 1 wherein said means for moving said actuator member from said unactuated position to said actuation position includes means for coupling said first portion of said actuator member rotationally with said spool.

3. Apparatus as defined in claim 1 wherein said first portion of said actuator member is supported for rotation about an axis, said second portion of said actuator member being spaced radially from said first portion, said spring means extending radially from said first portion to said second portion.

4. Apparatus as defined in claim 3 wherein said spring means supports said first portion of said actuator member for rotation about said axis between said unactuated position and said actuated position, said spring means maintaining a constant radial spacing between said first portion and said axis throughout rotation of said first portion between said unactuated position and said actuated position.

5. Apparatus as defined in claim 1 wherein said spring means resist movement of said actuator member from said unactuated position toward said actuated position and urges said actuator member to move from said actuated position toward said unactuated position.

6. Apparatus as defined in claim 1 further comprising sensing means for sensing acceleration of said spool at or above a predetermined acceleration, said means for moving said actuator member from said unactuated position to said actuated position being responsive to said sensing means.

7. Apparatus as defined in claim 1 further comprising sensing means for sensing at least a predetermined amount of declaration of a vehicle, said means for moving said actuator member from said unactuated position to said actuated position being responsive to said sensing means.

8. Apparatus as defined in claim 1 wherein said actuator member comprises a continuous piece of molded plastic which includes both said means for actuating said locking means and said spring means.

9. Apparatus comprising:
   a frame;
   a spool supported for rotation on said frame;
   locking means for blocking rotation of said spool when said locking means is actuated;
   actuator means for actuating said locking means said actuator means including an actuator member having a first portion supported for movement relative to said frame, said first portion of said actuator member actuating said locking means upon movement of said first portion of said actuator member into an actuated position; and
   means for moving said first portion of said actuator member into said actuated position;
   said actuator member further having a second portion which is fixed to said frame and a third portion which comprises a spring means acting between said first portion and said second portion for resisting movement of said first portion relative to said second portion.

10. Apparatus as defined in claim 9 wherein said first portion of said actuator member comprises a wheel supported for rotation about an axis, said spring means extending radially from said second portion of said actuator member to said wheel.

11. Apparatus as defined in claim 9 wherein said first portion of said actuator member is supported for rotation about an axis, said members for moving said first portion of said actuator member into said actuated position including means for coupling said first portion of said actuator member rotationally with said spool.

12. Apparatus as defined in claim 11 wherein said first portion of said member has a plurality of ratchet teeth, said coupling means including a pawl supported for movement into and out of engagement with said ratchet teeth.

13. Apparatus as defined in claim 9 wherein said spring means resist movement of said portion of said actuator member toward said actuated position.

14. Apparatus as defined in claim 9 further comprising sensing means for sensing acceleration of said spool at or above a predetermined acceleration, said means for moving said first portion of said actuator member into said actuated position being responsive to said sensing means.

15. Apparatus as defined in claim 9 further comprising sensing means for at least a predetermined amount of declaration of a vehicle, said means for moving said first portion of said actuator member into said actuated position being responsive to said sensing means.

16. Apparatus comprising:
    a frame;
    a spool supported for rotation on said frame in a winding direction and an unwinding direction;
    locking means for blocking rotation of said spool in said unwinding direction when said locking means is actuated;
    actuator means for actuating said locking means, said actuator means including an actuator member having a wheel portion supported for rotation about an axis relative to said frame, said wheel portion of said actuator member having means for actuating said locking means upon rotation of said wheel portion from an actuated position to an actuated position; and
    rotating means for rotating said wheel portion of said actuator member from said unactuated position to said actuated position, said rotating means including means for coupling said wheel portion of said actuator member rotationally with said spool;
    said actuator member further having a hub portion which is fixed to said frame and a spring portion which resists rotation of said wheel portion relative to said hub portion, said spring portion including a spring arm extending radially from said hub portion to said wheel portion.

17. Apparatus as defined in claim 16 further comprising sensing means for sensing acceleration of said spool at or above a predetermined acceleration, said wheel portion of said actuator member having a plurality of ratchet teeth, said rotating means including a pawl supported for movement into engagement with said ratchet teeth in response to said sensing.

18. Apparatus as defined in claim 16 further comprising sensing means for sensing at least a predetermined amount of declaration of a vehicle, said rotating means coupling said wheel portion of said actuator member rotationally with said spool in response to said sensing.

19. An actuator for a vehicle seat belt retractor, the retractor having a spool supported for rotation on a frame and a movable locking member which blocks rotation of the spool when the locking member is in a locking position, said actuator comprising:
    a hub having an axis, said hub further having means for fixing said hub relative to the frame and for thus precluding rotation of said hub about said axis relative to the frame;
    a wheel centered on said axis, said wheel having means for moving the lock bar into the locking position upon rotation of said wheel relative to the frame; and
    spring means for supporting said wheel for rotation about said axis relative to said hub against the bias of said spring means, said spring means including a spring arm extending radially from said hub to said wheel.

20. An actuator as defined in claim 19 wherein said spring means comprises a plurality of spring arms extending radially from said hub to said wheel.

21. An actuator as defined in claim 19 wherein said wheel has a plurality of ratchet teeth.

22. An actuator as defined in claim 21 wherein said means for moving the lock bar into the locking position comprises a cam portion of said wheel which is located radially outward of said ratchet teeth.

23. An actuator as defined in claim 19 wherein said hub, said wheel, and said spring arms are portions of a continuous piece of molded plastic.

24. Apparatus comprising:

a frame;

a spool supported for rotation on said frame;

locking means for blocking rotation of said spool when said locking means is actuated;

actuator means for actuating said locking means, said actuator means including an actuator member having a first portion supported for movement relative to said frame, said first portion of said actuator member actuating said locking means upon movement of said first portion of said actuator member into an actuated position; and means for moving said first portion of said actuator member into said actuated position;

said actuator member further having a second portion which is fixed to said frame and a third portion which comprises a spring means acting between said first portion and said second portion for resisting movement of said first portion relative to said second portion, said first portion of said actuator member comprising a wheel supported for rotation about an axis, said spring means extending radially from said second portion of said actuator member to said wheel, said second portion of said actuator member comprising a hub located radially outward from said hub to said wheel.

25. Apparatus as defined in claim 24 wherein said spring means comprises a plurality of spring arms extending radially outward from said hub to said wheel.

26. Apparatus comprising:

a frame;

a spool supported for rotation on said frame;

locking means for blocking rotation of said spool when said locking means is actuated;

actuator means for actuating said locking means, said actuator means including an actuator member having a first portion supported for movement relative to said frame, said first portion of said actuator member actuating said locking means upon movement of said first portion of said actuator member into actuated position; and means for moving said first portion of said actuator member into said actuated position;

said actuator member further having a second portion which is fixed to said frame and a third portion which comprises a spring means acting between said first portion and said second portion for resisting movement of said first portion relative to said second portion, said actuator member comprising a continuous piece of molded plastic which includes said first, second and third portions of said actuator member.

27. Apparatus comprising:

a frame;

a spool supported for rotation on said frame in a winding direction and an unwinding direction;

locking means for blocking rotation of said spool in said unwinding direction when said locking means is actuated;

actuator means for actuating said locking means, said actuator means including an actuator member having a wheel portion supported for rotation about an axis relative to said frame, said wheel portion of said actuator member having means for actuating said locking means upon rotation of said wheel portion from an unactuated position to an actuated position; and rotating means for rotating said wheel portion of said actuator member from said unactuated position to said actuated position, said rotating means including means for coupling said wheel portion of said actuator member rotationally with said spool;

said actuator member further having a hub portion which is fixed to said frame and a spring portion which resists rotation of said wheel portion relative to said hub portion, said spring portion including a spring arm extending radially from said hub portion to said wheel portion, said spring portion of said actuator member comprising a plurality of spring arms extending radially from said hub portion to said wheel portion.

28. Apparatus comprising:

a frame;

a spool supported for rotation on said frame in a winding direction and an unwinding direction;

locking means for blocking rotation of said spool in said unwinding direction when said locking means is actuated;

actuator means for actuating said locking means, said actuator means including an actuator member having a wheel portion supported for rotation about an axis relative to said frame, said wheel portion of said actuator member having means for actuating said locking means upon rotation of said wheel portion from an unactuated position to an actuated position; and rotating means for rotating said wheel portion of said actuator member from said unactuated position to said actuated position, said rotating means including means for coupling said wheel portion of said actuator member rotationally with said spool;

said actuator member further having a hub portion which is fixed to said frame and a spring portion which resists rotation of said wheel portion relative to said hub portion, said spring portion including a spring arm extending radially from said hub portion to said wheel portion, said actuator member comprising a continuous piece of molded plastic which includes said wheel portion, said hub portion and said spring portion of said actuator member.

* * * * *

UNITED STATES PATENT AND TRADEMARK OFFICE
CERTIFICATE OF CORRECTION

PATENT NO. : 5,487,515
DATED : January 30, 1996
INVENTOR(S) : Michael K. Hishon, et. al.

It is certified that error appears in the above-indentified patent and that said Letters Patent is hereby corrected as shown below:

Column 9, line 47, change "members" to --means--.
Column 9, line 65, change "declaration" to --deceleration--.
Column 10, line 36, change "declaration" to --deceleration--.
Column 11, line 25, should read--radially inward of said wheel, said spring means extending radially outward from said hub to said wheel--.

Signed and Sealed this

Twenty-second Day of October, 1996

Attest:

BRUCE LEHMAN

Attesting Officer     Commissioner of Patents and Trademarks